United States Patent [19]
Cruz, Jr.

[11] 3,767,437
[45] Oct. 23, 1973

[54] PHOSTHETIC STRUCTURES DERIVED FROM COLLAGEN

[75] Inventor: Mamerto M. Cruz, Jr., Pennington, N.J.

[73] Assignee: Avicon, Inc., Ft. Worth, Tex.

[22] Filed: Oct. 20, 1971

[21] Appl. No.: 190,817

Related U.S. Application Data

[63] Continuation-in-part of Ser. No. 823,959, May 12, 1969, abandoned.

[52] U.S. Cl. .................................. 106/161, 128/1
[51] Int. Cl. ...................... C08h 7/06, C08h 17/04
[58] Field of Search ............................. 106/161, 155

[56] References Cited
UNITED STATES PATENTS
3,443,261  5/1969  Battista ............................. 106/161
3,408,918  11/1968  Talty et al. .......................... 106/155
2,934,447  4/1960  Highberger .......................... 106/155

Primary Examiner—Theodore Morris
Attorney—George F. Mueller et al.

[57] ABSTRACT

Artificial ivory and bone-like structures are formed from a complex partial salt of collagen with a metal hydroxide and with an ionizable acid such as calcium hydroxide and phosphoric acid. Calcium phosphate may be intimately mixed with the complex partial collagen salt before shaping into a desired configuration. Structural strength may be increased by incorporating fibers and other ions may be included to increase hardness.

10 Claims, No Drawings

PHOSTHETIC STRUCTURES DERIVED FROM COLLAGEN

This application is a continuation-in-part of my co-pending application Ser. No. 823,959, filed May 12, 1969, now abandoned.

This invention relates to a new composition of matter, particularly well suited for prosthetic devices, and to a process for manufacturing the same.

The supporting skeleton of vertebras consists of cartilage and bone. In the embryonic stages, cartilage forms this supporting skeleton and most of the cartilage is replaced in the adult by bone. Cartilage persists in adults at bone joints and in other locations such as the ear, nose, etc. The principal organic constituent of cartilage and bone tissue is collagen and the principal inorganic component in cartilage and bone tissue is calcium phosphate complexes or compounds such as, for example, hydroxyapatite. The chief inorganic constitutents are calcium, magnesium, phosphate radicals, carbonate radicals, the fluoride radical and water, the compounds being of varying compositions generally belonging to the apatite group. Other inorganic ions are generally present in trace amounts and other organic matter is also present. The other elements found in minor and trace amounts in bone tissue are aluminum, barium, boron, chlorine, copper, iron, lead, manganese, potassium, sodium, strontium and tin while arsenic bismuth, lithium, molybdenum, nickel, selenium, silicon, silver and zinc have been detected spectrographically. In general, the differences in hardness and rigidity between cartilage and bone tissue are due to the differences in composition such as differences in the ratios of collagen to the inorganic calcium phosphate compounds and the presence of other radicals as well as the morphological structure.

The bone tissue consists of bundles of collagenous fibers in an amorphous cement material which is probably a protein-polysaccharide complex impregnated with the calcium phosphate complexes or compounds. Sulfur is also included and appears to be present as ester sulfate associated with the polysaccharides. Differences in hardness and other characteristics of the different bone tissues and parts of bone are believed to be due to variations in amounts of calcium carbonate and other constituents such as magnesium fluorine, the carbonate radical, etc. absorbed on the surface of the hydroxyapatite crystals, or the fluoride and carbonate radical may replace the hydroxy radical. Regardless of the precise manner in which these additional substances are associated with the calcium phosphate compounds, these substances appear to alter the crystal lattices of the phosphate compounds. Differences in physical characteristics are also influenced by the morphology of the specific or individual bone tissue. Roughly, the ratio of the collagenous material to the inorganic material in the human bone is slightly less than 1:3, varying from about 1:2.65 to about 1:2.89 in the human femur, based on the weight of dry defatted bone. The foregoing is obviously an oversimplification of the structure and composition of bone tissue which in fact is a most complex structure varying in precise composition with age, individual and species of mammals.

The precise method by which this class of tissue is formed is not known. Physico-chemical theories have been advanced in an attempt to explain the formation of dental calculus and it is possible that bone tissue might be formed in a somewhat similar manner. According to this theory, saliva is considered to be a colloidal solution of proteins which is more or less saturated with calcium and phosphate ions. Surface tension is believed to cause the proteins to concentrate at the surface of the saliva thus reducing the viscosity of the liquid and causing a settling out of inorganic salts which deposit on the teeth surfaces.

Thus far, cartilage and bone tissue has not been formed or duplicated synthetically. In bone surgery, a variety of materials has been used including bone, bone derivatives and synthetic substitutes. Bone from which certain constituents such as minerals, proteins, lipids and water have been removed is generally classed as bone derivative. Synthetic substitutes include metals, certain synthetic polymers, calcium sulfate and hydroxyapatite.

The chemistry of sparingly soluble phosphate salts or specifically the system $Ca-P_2O_5-2H_2O$ and the precise chemistry and structure of the calcium phosphate compounds occurring in natural cartilage and bone tissue are extremely complex. Accordingly, the term 'calcium phosphate" is used herein and in the claims to include dicalcium phosphate, tricalcium phosphate, octacalcium phosphate, hydroxyapatite, carbonate-apatite, chlorapatite, fluorapatite and mixtures thereof.

In U.S. Pat. No. 3,443,261 there is disclosed a method of forming structures from a homogeneous mixture of a water-insoluble, micro-crystalline, ionizable, partial salt of collagen and calcium phosphate with or without inclusion of other ions such as found in naturally occurring bone and cartilage. The product consists primarily of an intimate and homogeneous physical mixture of the various ingredients and various ions may be included to increase the hardness of the product and collagen cross-linking agents may be used in manufacturing the products so as to improve the moisture-resistance and water-resistance of the products.

The principal purpose of the present invention is to provide a new compositon of matter for the preparation of structures resembling cartilage and bone tissue with improved moisture-resistant and water-resistant properties.

The present invention contemplates formimg a new composition of matter comprising a water-insoluble, colloidally dispersible, complex partial salt of collagen with a polyvalent metal cation and an ionizable anion, with or without a homogeneous, intimate mixture of a salt of a polyvalent metal and an ionizable anion in a mesoamorphous state.

The collagen molecule contains both carboxyl groups and amino groups, the free and available carboxyl groups being sites for the addition of a cation and the free and available amino groups being sites for the addition of ionizable anions. Both carboxyl and amino groups are also present internally of the three inter-coiled polypeptide chains but conditions of treatment are insufficient to penetrate the macromolecular structure. Briefly, in forming the new composition, the collagen source material such as mechanically shredded and ground bovine collagen or other collagen source material is treated with a solution of a polyvalent metal hydroxide, the solution having a pH of from about 8 to 12 preferably between 10.0 and 12. The polyvalent metals satisfactory for the purposes of this invention are those polyvalent metals whose hydroxides are soluble in water at pH's between pH 8 to pH 12 such as, for example, aluminum, cadium, calcium, chromium, iron, magnesium and zinc. The treatment of the collagen with the alkaline solution of the metal hydroxide results in a salt bridging reaction whereby the metal cation will react with free and available carboxyl groups of adjacent collagen molecules to form a partial metal salt. This metal salt is then preferably recovered and washed free of soluble salts.

The recovered partial metal salt is treated with a dilute solution of ionizable acids such as hydrochloric acid, hydrobromic acid, hydroiodic acid, phosphoric acid, sulfuric acid, acetic acid, citric acid and oxalic acid. Other ionizable acids which will form amine salts with the free and available amino groups on the collagen molecule are satisfactory but from a practical commercial standpoint the foregoing acids are the most feasible. After reaction with the acid, the complex salt may be recovered in dry form. Preferably, the reaction product is separated by centrifuging to remove excess liquid and the product then slurried in a water-miscible organic solvent such as methanol, ethanol, isopropanol and the like. The product is again centrifuged to separate it from the bulk of the liquid and then air dried or dried in an oven preferably under 100°C. to form a dry, white, fluffy, fibrous material.

The fibrous material may be dispersed in water preferably by an attrition operation to produce a colloidally dispersible material and forms stable viscous gels at solids concentrations of as low as 0.5 percent by weight. The dispersion preferably at higher concentrations are dried to form desired shaped structures. The pH of the dispersions and the specific drying method will determine the physical characteristics of the products. For example, a product formed by treating the collagen with a calcium hydroxide solution and subsequently treating the recovered calcium salt with phosphoric acid when dispersed in water in an amount of 3 grams of the calcium-phosphate-collagen reaction product in 497 grams of deionized water in a Waring Blendor exhibited an initial pH of 3.5 when slurried in the water and after 5 minutes attrition exhibited a pH of 3.7. The viscosity 2 hours after preparation of the dispersion measured with a Brookfield Viscometer Model HAT at 10 rpm. and 20°C. was 12,200 cps. After 24 hours, the viscosity was 12,620 cps. and remained at this value for the period of test which was several days. A similar dispersion wherein the pH was adjusted by the addition of dilute phosphoric acid to an initial pH of 2.9 exhibited a final pH of 3.1. The viscosity after 2 hours was 14,680 cps. and after 24 hours was 13,760 cps. and the viscosity again remained constant.

In both instances, the gel when poured into a shallow pan and allowed to air dry formed tough, flexible, amber colored cartilage-like structures. These same dispersions when freeze-dried formed porous, sponge-like structures, the interconnecting portions of material varying from fiber-like to small film- or flake-like microscopic sub-structures.

The freeze-dried product formed from the gel as described above having a pH of 3.7, exhibited a porous, sponge-like structure. When immersed in water, the product exhibited a substantial swelling but retained its coherent structure without disintegrating. Heat treatment as, for example, heating the dry structure at 105°C. for 3 hours reduces the degree of swelling when immersed in water. On the other hand, when the pH of the dispersion is increased by the addition of ammonia to a pH of about 4.5 before freeze-drying, the product obtained shows a marked reduction in swelling. Air dried or oven dried products which are continuous films or non-porous structures exhibit these same water absorption and swelling characteristics when prepared from dispersions at different pH values.

Ivory-like and bone-like structures are obtained by mixing with the dispersion of the partial salt of collagen a mesoamorphous salt of a polyvalent metal and the particular acid. In forming these structures, the amount of polyvalent metal salt may vary from several percent to 70 percent based upon the weight of the partial salt of collagen. The compositions containing the lower proportions of metal salt will be cartilage-like whereas those containing over about 40 percent of the metal salt will resemble ivory and bone. Obviously, the higher the proportion of polyvalent metal salt, the more dense the final product and there is no sharp division between the flexibility, pliability, density and hardness of the products within the stated range of proportions there being a gradual decrease in flexibility and pliability and an increase in hardness as the proportion of the metal salt is increased. The stability of these products will vary depending upon the pH of the dispersion from which the product is obtained in the manner as described above.

In forming compositions for bone-like structures, other desired ions and the so-called trace elements and radicals may be included in the dispersion or gel. For example, assuming a calcium-phosphate-collagen salt and calcium phosphate dispersion or gel, the fluoride, carbonate ion, etc., may be included so as to form fluoro-apatite and carbonate-calcium phosphate compounds such as the hydroxyapatite-carbonate compounds present in some bone tissues.

In the mammals, cartilage and bone must withstand one or more of several forces such as compression, bending, twisting and impact forces. The resistance to some of these forces and certain of the physical strength characteristics of the products of this invention may be altered and improved by incorporating in the aqueous dispersions or gels fibers which function as reinforcing elements.

The fibers may be formed of synthetic polymers such as, for example, polyesters, nylon, polytetrafluoroethylene, polyolefins and polycarbonates, and of natural polymers such as, for example, collagen fibers, amylose fibers, chitin and the like. These fibers may be of any desired size such as conventional textile sizes which vary from about 1 to 10 deniers and vary in length from about one-fourth inch to conventional staple lengths of about 1 9/16 inch. The fibers may be incorporated as individual fibers or in some instances the fibers may be felted or woven or knitted into a desired porous or foraminous fabric in sheet or tubular or other desired configuration which is subsequently impregnated and coated with the calcium-phosphate-collagen salt and calcium-phosphate dispersion. Fibers may constitute from about 1 percent to 80 percent, preferably 15percent–60 percent, by weight, of the finished product depending upon the specific application.

The complex partial calcium-phosphate-collagen salt is derived or prepared from undenatured collagen. The preferred source of collagen is bovine collagen or hide, that is, that portion of the hide which is essentially collagen and from which the hair and flesh have been removed. Essentially, this material is also referred to as the corium of the hide. Other sources of collagen such as, for example, moose hide, pigskin, goatskin and sheepskin are also satisfactory.

The collagen source material is preferably in a ground fibrous form such as produced by the use of the conventional Urschel Mill. The finely divided fibrous collagen is slurried in a solution of the metal hydroxide having a pH of between about 8 and 12. The solids concentration, that is, the proportion of fibrous collagen, may be as desired, preferably up to about 10 percent, a 5 percent solids slurry constituting a readily handleable slurry. It is, of course, desirable to agitate the slurry constantly and it has been found that a convenient practice includes starting the reaction with about 90 percent of the metal hydroxide solution and slowly adding additional solution so as to maintain the desired pH. In general, a mixing period of from about 10 minutes to about 30 minutes depending upon the solids concentration is satisfactory. At a 50 percent solids concentration a period of 15 minutes is satisfactory. The temperature is maintained below about 30°C. and should be below a temperature at which collagen is denatured.

During the slurrying operation, the dissolved metal hydroxide reacts with the free and available carboxyl groups on adjacent collagen molecules to form a so-called salt bridge. The reaction product is separated from the large bulk of liquid as by centrifuging and may be conveniently recovered as a wet cake containing for example from 20 percent to 40 percent solids.

The wet cake is slurried in a water-miscible organic solvent which may contain the dissolved acid. The aqueous acid solution is preferably premixed with the water-miscible organic solvent to avoid the possibility of contacting portions of the metal-collagen reaction product with more concentrated acid than other portions of the metal-collagen reaction product. The amount of acid present may vary from about 0.2 to about 0.8 millimole of acid per gram of collagen. Bovine collagen contains about 0.78 millimole of available primary amino groups per gram of collagen and products prepared from such collagen will have a bound acid content ranging from about 0.15 to about 0.7 millimole per gram of collagen (about 20 percent to about 90 percent of the stoichiometric bound acid content) with an average of about 0.58 millimole per gram of collagen.

The reaction may be carried out in a planetary mixer so as to insure a thorough dispersion of the metal-collagen salt in the dilute acid solution. The solids concentration may vary up to about 15 percent and the period of mixing may range from about 10 to 30 minutes. A satisfactory mixing may be performed in a conventional Hobart mixer at a solids concentration of about 10 percent for about 15 minutes. Because of the nature of the slurried collagenous material, concentrations are limited because of handling difficulties. The specific type of mixing apparatus utilized in both reaction operations may be selected on the basis of the solids concentration. Simple paddle mixers or stirrers are satisfactory for the lower concentrations while planetary mixers and apparatus such as the Cowles Dissolver and a Bauer mill may be used for the higher solids concentrations.

Following the reaction with the acid, the complex partial ionizable salt is separated from the bulk of the liquid as by centrifuging and the salt or reaction product recovered as a wet cake. The wet cake is slurried in water or a water-miscible organic solvent, preferably in an organic solvent, to remove soluble substances and the salt separated from the bulk of the liquid and then dried to recover the complex salt. Preferably, the water-miscible organic solvent is utilized at least in the final washing step to provide a dry product which is fluffy and fibrous in nature. The replacement of water by an organic solvent reduces swelling and also prevents hydrogen bonding during drying.

The dry, white, fluffy product is dispersible in water and preferably the dispersion is formed by the use of equipment capable of attriting the complex salt to a colloidal condition. Dispersions containing 0.5 percent solids exhibit a decrease or increase in viscosity of not more than about 10 percent within 24 hours after preparation. Thereafter, the viscosity remains substantially constant, that is, it does not change more than a few percent over a storage period of 1 week when stored at 5°C. under conditions which prevent the loss of water.

In preparing the structure from the dry, white, fluffy product dispersed in the aqueous medium, the character of the structure will be determined by the specific drying method. A dispersion free of dispersed gas when air dried will produce a hard, dense, horn-like structure. Where the dispersion contains dispersed gas, the structure will be a porous but hard, horn-like structure. A dispersion free of dispersed gas when freeze dried will produce a structure having porosity but is hard and rigid comparable to the natural cancellous bone structure. Where the structure is freeze dried from a dispersion containing dispersed gas as, for example a foam-like dispersion, the structure will be highly porous. If desired, a finely divided blowing agent may be incorporated in the high solids dispersions or mixtures before drying. Blowing agents, such as for example ammonium carbonate, upon heating of the mixture become decomposed to gases thereby creating pores, the size of which may be varied by varying the particle size of the blowing agent.

In order to simplify the description, reference will be made to the preparation of structures comparable to natural bone tissue by reference to the use of the calcium-phosphate-collagen complex salt and calcium phosphate. It is obvious that where it is desired to use other cations and other anions they may be substituted fo the calcium and phosphate ions to form structures with similar properties.

In forming synthetic cartilage-like and bone-like structures of the present invention, mesoamorphous calcium phosphate is mixed with an aqueous gel of the water-insoluble ionizable complex collagen salt. Since bone tissues contain some citric acid and phosphate salts, the complex collagen salt is preferably prepared by treatment of the collagen source material with citric acid or phosphoric acid or an acid phosphate salt so as to avoid the presence of what may be termed foreign ions in the product. The calcium phosphate may be formed by mixing solutions of a soluble phosphate, such as, for example, sodium phosphate and a soluble calcium salt, such as, for example, calcium acetate, so as to provide a desired molar ratio of calcium to phosphate, preferably to provide a ratio of about 1.6:1.

In the biological formation of bone tissue and particularly the hard tissue of teeth, an apatite-carbonate compound is produced which apparently accounts for the extreme hardness of such tissue. In the production of the structures according to this invention, desired amounts of the various anions may be incorporated in the gel mixtures, preferably in the preparation of the calcium phosphate, to provide relative ratios approximating those of natural bone tissue. In the addition of, for example, the carbonate anion and the fluoride anion, about 1 to 10 molar percent, preferably 2 to 5 percent, of the phosphate anion may be replaced by the carbonate anion and about 0.05 to 2 molar percent, preferably 0.1 to 0.6 percent, of the phosphate ion may be replaced by the fluoride anion. Where it is desired to incorporate other ions such as the carbonate and fluoride anions, solutions of salts such as sodium carbonate ane sodium fluoride are preferably added during the preparation of the calcium phosphate. Preferably, these solutions are added to the soluble phosphate solution so that upon mixing with the solution of the calcium salt, the salts containing the other ions will co-precipitate with the calcium phosphate.

The solutions of the soluble salts are preferably mixed under vigorous agitation. The resulting slurry of the insoluble salts will generally have an alkaline pH of from 10.5 to about 12. The mesoamorphous calcium phosphate is separated by filtration and washed thoroughly with water so as to remove soluble salts. The recovered wet salt is slurried in water and just prior to the addition of the slurry to an aqueous gel of the microcrystalline collagen salt, the pH of the slurry is preferably adjusted to a pH of between about 3 to 5 by the addition of acetic acid. Alternatively, the slurry having the alkaline pH is slowly added to the complex collagen salt dispersion which has a pH of about 2.5 to about 5.5 with constant agitation. The pH of the combined slurry and dispersion is then lowered to a value within the pH range of the dispersion by the addition of an acid such as acetic or phosphoric acids. As the pH of the liquid containing the slurried calcium phosphate is lowered to an acid pH, there results a structural crystalline transformation of the calcium phosphate.

The mixtures are dried to a moisture or water content of from about 5 percent to about 25 percent. Where porous structures are desired, drying is preferably effected by a freeze drying process. After the moisture content has been reduced to a value within this range, the structures are preferably heated, as in an oven in an inert atmosphere, to a temperature between about 100°C. and about 120°C. for from 2 to 10 hours. This heating step further increases substantially the stability of the structural characteristics of the products in the presence of aqueous liquids.

The predetermined structure is formed by extrusion or molding or other desired techniques. To form relatively thin structures, the combined slurry and dispersion may be placed in a tray to a desired thickness and dried by any desired method. Alternatively, heavy dispersions or paste-like dispersions (higher solids concentration dispersions) may be cast in desired molds. As a further alternative, blocks may be formed and desired products formed by machining.

The following specific examples are set forth merely to illustrate the application of the present invention:

EXAMPLE 1

Urschel milled, vacuum freeze dried bovine collagen was mixed with water to form a swollen fibrous mass containing 30 percent solids. A solution of calcium hydroxide was prepared in deionized water, the solution having a pH of 11.6. 670 parts by weight of the swollen fibrous mass was mixed into 3,330 parts of the calcium hydroxide solution. Approximately 300 ml. of 1 N calcium hydroxide solution was added during the mixing operation to maintain the pH at 11.6. The mixing operation was carried out for 15 minutes at room temperature. The slurry was then centrifuged to a 30 percent solids concentration wet cake. A 10 percent solids slurry was prepared in a Hobart mixer by adding 670 parts of the wet cake to a preformed mixture of 1330 parts of isopropanol and 13.34 parts of an 85 percent solution of phosphoric acid. Mixing was continued for 15 minutes. The resulting reaction product was separated from the bulk of the liquid by centrifuging to a solids content of about 30 percent. The recovered wet material was slurried in 1,330 parts of isopropanol, again centrifuged and then air dried.

The calcium-phosphate-collagen complex salt thus prepared was a white, fluffy, fibrous material. Upon forming a 3 percent solids dispersion of the product in deionized water in a Waring Blendor for 15 minutes there resulted a viscous dispersoid having a viscosity 2 hours after preparation of 12,200 cps. as measured in a Brookfield Viscometer, Model HAT, at 10 rpm. and 25°C. After 24 hours, the viscosity had risen to 12,620 cps. and remained practically constant during further storage at 5°C. At the initial stage of the dispersing operation, the pH of the liquid was about 3.5 and at completion the pH was about 3.7.

In a like manner, another dispersoid was prepared and the initial pH was adjusted to 2.9 by the addition of dilute phosphoric acid. The final pH was 3.1. The viscosity 2 hours after preparation was 14,680 cps. and decreased to 13,760 cps. at the end of 24 hours. Further storage exhibited no significant change in viscosity.

A portion of each dispersoid was poured into a shallow pan to a depth of about one-half inch and air dried to a moisture content of about 10% after which the pans were transferred to an oven maintained at 100°C. The film-like structure was dried to a moisture content of about 3 percent.

A portion of the dispersoid having a final pH of 3.7 was freeze dried for 12 hours to a water content of about 4 percent (−40° to −50°C., vacuum 5 microns, heating cycle not exceeding 30°C. with condensation of water at 60°C.). The pH of another portion of the dispersoid was raised to about a pH of 4.5 by the addition of a calcium hydroxide solution. The dispersoid was then freeze dried.

Both products had a porous, sponge-like structure with fine pores. The interconnected solid material examined under a microscope appeared to have a fibrous and flake-like structure without visible evidence of separated calcium phosphate. Both structure when placed in water exhibit a swelling but remain as coherent, non-gelatinous bodies and will not disintegrate. The higher the pH of the dispersoid prior to freeze drying the lower the swelling.

EXAMPLE 2

A calcium-phosphate-collagen complex salt was prepared as described in Example 1.

A calcium phosphate slurry was formed by mixing a solution of 4.78 parts of trisodium phosphate in 100 parts by weight of deionized water with a solution of 17.6 parts of calcium acetate in 100 parts of deionized water. The resulting slurry had a pH of 11.3. The calcium phosphate was recovered and washed with deionized water to remove soluble salts.

A dispersoid was formed containing 6% by weight of the calcium-phosphate-collagen complex salt in deionized water. The dispersoid in this instance had a pH of 4.5. The freshly recovered calcium phosphate wet cake (about 40% solids) in an amount equivalent to approximately 2.5 times the quantity of collagen complex salt was added to the dispersoid in a Sigma blade mixer. The pH of the wet cake was about 10.5. The pH of the mixture was slowly adjusted to a pH of about 4.5 to 5.0 by the addition of phosphoric acid. Mixing was continued for about 2 hours and the temperature was maintained below 25°C. during adjustment of the pH (the first one-half hour) and the temperature then allowed to increase to about 80°C. by the end of the mixing operation. The final mixture was in the form of a wet, moldable mass.

A portion of the mass was molded into a rectangular structure and allowed to air dry at room temperature with forced air circulation. The air dried material containing about 15% moisture was then oven dried at 105°C. for about 12 hours.

The product was hard, dense bone-like in character. A like hard, bone-like but lower density product was obtained when a like rectangular molded structure was freeze dried as described in Example 1.

The products of both Examples 1 and 2 have a sufficiently high structural stability to withstand boiling in water without disintegrating. Samples of products of Examples 1 and 2 withstand boiling water for a period of at least 6 hours without loss of coherence in the structure.

In the event other anions are desired, such as, for example, the fluoride or carbonate ions, suitable salts such as sodium or calcium fluoride or sodium carbonate are incorporated in the solutions during the formation of the calcium phosphate.

The foregoing examples are merely illustrative. For example, in preparing the collagen complex salt, other metal hydroxides are substituted for the calcium hydroxide in Example 1. It is recognized that certain hydroxides such as aluminum and chromium hydroxides are probably not considered as being in true solution but exist at the high pH's in such state that they will react as does the calcium hydroxide. Thus, in speaking of metal hydroxides soluble at pH 8 to pH 12, it is intended that these types of metal hydroxides are included in the definition. The physical properties of the products formed by such substitution are substantially the same as described in Examples 1 and 2.

Any of the described acids may be substituted for the phosphoric acid of Example 1 in preparing the collagen complex salt. For example, citric acid may be used and the added salt of Example 2 may be calcium phosphate. Alternatively, mixtures of the acid may be used.

As also described hereinbefore, the structural characteristics may be altered by incorporating in the dispersoid inert fibers. For example, the bend or twisting strengths of the products of Examples 1 and 2 are increased by incorporating 1½ denier nylon 66 staple fibers or other fibers. Urschel milled collagen fibers of a diameter of 35–40 microns and having lengths of about one-fourth inch are also satisfactory.

The compositions as disclosed herein and particularly those having the higher ratios of calcium phosphate compounds to collagen are satisfactory for the production of three-dimensional, self-supporting, impact-resistant structures. The three dimensional structures are readily machined, sawed, drilled and worked and may be given a fairly high polish. The hard, dense, compact structures when machined and polished, for example, have much the same appearance and feel as ivory. Accordingly, the structural material may be used to replace ivory in musical instruments such as piano keys. Billiard balls, costume jewelry and blocks may also be used for sculpturing. Because of the collagen content, a variety of dyes may be used to provide any desired color.

As indicated hereinabove, the principal inorganic constituent of the compositions, that is, the calcium phosphate compounds may vary in the ratio of calcium to the phosphate ion from about 1:1 to about 1.6:1 and it is probable that in some instances there occurs in the mass a mixture of specific calcium phosphate compounds. In the production of articles such as, for example, combs, spatulas, etc., a high solids content aqueous mixture of the dispersoid and clacium phosphate may be utilized with added fibers to increase flexural strength and a cross-linking agent to improve moisture and water resistance. The mixture may be shaped by the use of press molds of the desired configuration.

In preparing the compositions for use in bone surgery where the structure will be inserted in a mammal such as a dog or cat, bactericides, fungicides and antibiotics may be incorporated in the products either during their preparation or, since many of the products are porous, these substances may be introduced by impregnation procedures. Hemostats may be included for a specific purpose where either a coagulant or anti-coagulant is desired in a specific site. Alternatively, a high solids content aqueous mixture of the dispersed collagen salt and calcium phosphate or a wet mass of a ground-up dried product may be used in the treatment of bone damage in the manner in which ground-up, moist bone is now used. In this instance, the bactericide, fungicide, antibiotic, hemostat or other desired additive is incorporated in the moist mass. Examples of agents which may be included are well known to those skilled in the art and include such substances as chlortetracycline, erythomycin, bacitracin and heparin sodium, etc.

As disclosed in U. S. Pat. No. 3,443,261, the collagenous constituent of the bone-like structures is a water-insoluble, ionizable, partial salt of collagen such as a phosphoric acid or citric acid partial salt wherein the salt has a bound acid content of from about 50% to 90% of the theoretical stoichiometric bound acid content. The collagenous constituent of the structures of the present invention contains a bound polyvalent metal and a bound acid content of from about 20% to about 90% of the theoretical stoichiometric bound acid content. The partial salt of collagen as utilized in U. S. Pat. No. 3,443,261 can not be converted to the collagenous material utilized in the present invention by treatment with an alkaline material such as barium hydroxide or basic aluminum acetate. Treatment with such alkaline materials removes the bound acid. The resistance of these various collagenous materials to boiling water differs markedly.

The differences in the resistance to boiling water may be illustrated by the following example:

EXAMPLE 3

A water-soluble, ionizable, partial salt of collagen was prepared in accordance with Example 1 of U. S. Pat. No. 3,443,261. To an aqueous solution of hydrochloric acid having a pH of 2.4 there was added sufficient Urschel milled, vacuum freeze dried bovine collagen so as to form a slurry containing 1% by weight of collagen. After slurrying at room temperature for about 15 minutes, the mass was transferred to a Waring Blendor where it was subjected to attrition for about 25 minutes at a temperature which was not allowed to exceed 25°C. The resulting gel had a pH of about 3.6. The gel was spread in a pan to a depth of about one-half inch and freeze dried over night (−40° to −50°C., vacuum 5 microns, heating cycle not exceeding 30°C. with condensation of sublimed water at 60°C.). The resulting porous, sponge-like product was identified as Sample A.

A portion of Sample A was placed in a 2 percent aqueous solution of barium hydroxide having a temperature of about 30°C. The sample was stirred in the solution for about 15 minutes, washed with a 50/50 by volume solution of ethanol and water and finally with ethanol. The sample was then dried in an air oven at a temperature of about 95°C. The dried sample was identified as Sample B.

Another portion of Sample A was treated in the same manner with a 2% solution of barium hydroxide in a 50/50 by volume solution of ethanol and water. The dried sample was identified as Sample C.

A white, fluffy, fibrous calcium-phosphate-collagen complex salt was prepared as described in Example 1. Sufficient of the fibrous material was added to deionized water in a Waring Blendor to form a 1% by weight dispersion and subjected to attrition for 15 minutes, maintaining the temperature below 30°C. The pH of the resulting dispersion had a pH of about 3.6. The gel was spread in a pan to a depth of about one-half inch and freeze dried overnight under conditions as set forth above. The resulting porous, sponge-like product was identified as Sample D.

In the same manner as one-half percent by weight dispersion was formed and spread in a pan to a depth of about one-half inch and freeze dried over night under conditions as set forth above. The resulting porous, sponge-like product was identified as Sample E.

A sixth sample was identified as Sample F. This sample was cut from a sample which had been prepared prior to May 1969 as described for the preparation of Sample D but after drying had been placed in distilled water and maintained in a closed container since that time.

All samples in dry condition exhibited a withe, porous, fibrous, sponge-like appearance, Sample E being somewhat more porous and lower in density than the other samples.

Portions of each of the samples when placed in water at room temperature exhibited a swelling to about a two-fold increase in thickness after becoming wet throughout. Samples A, D, E and F exhibited no further change in appearance after several hours, however, Samples B and C exhibited some internal separation and individual fibers appeared along the edges of the samples.

Portions of each of the samples when placed in boiling water exhibited a similar swelling after becoming wet throughout. The subsequent action of the samples is set forth in the following table:

TABLE

| Sample A | Shrinks about one-third from swollen condition in about 15 minutes. Became somewhat gelatinous in about 30 minutes. Lost its shape and became a sticky mass in about 1 hour. |
| Sample B | Began to disintegrate in about 5 minutes. |
| Sample C | Began to disintegrate in about 5 minutes. |
| Sample D) | Shrink about one-third to one-half from swollen condition |
| Sample E) | in about 30 minutes but retain fibrous, intact |
| Sample F) | structure with no detectable gelatinous condition or stickiness after 6 hours. |

I claim:

1. The method of preparing a three-dimensional, water-insoluble structure comprising reacting undenatured collagen with a solution of a polyvalent metal hydroxide having a pH of between about 8 and 12 and at a temperature not exceeding 30°C., the polyvalent metal hydroxide being soluble in water at a pH of between about 8 and 12, recovering the metal-collagen reaction product, reacting the metal-collagen reaction product with from about 0.2 to about 0.8 millimole of an ionizable acid per gram of collagen, based upon collagen containing about 0.78 millimole of available primary amino groups per gram of collagen to form a complex, partial salt of collagen with the polyvalent metal cation and the ionizable anion containing from about 0.15 to about 0.7 millimole of bound acid per gram of collagen, based upon collagen containing about 0.78 millimole of available primary amino groups per gram of collagen, shaping the complex partial salt into a predetermined structural configuration and drying the shaped structure to a moisture content of from about 5 percent to 25 percent, heating the dried structure to a temperature between about 100°C. and 120°C. in an inert atmosphere and maintaining the structure at such temperature for from 2 to 10 hours.

2. The method of claim 1 wherein the polyvalent metal hydroxide is calcium hydroxide.

3. The method of claim 1 wherein the acid is phosphoric acid.

4. The method of claim 1 wherein the polyvalent metal hydroxide is calcium hydroxide and the acid is phosphoric acid.

5. The method of claim 1 wherein calcium phosphate is added to the complex partial salt of collagen before shaping into the predetermined structural configuration.

6. A unitary three-dimensional structure comprising a water-insoluble, complex partial salt of collagen containing a bound polyvalent metal ion, the polyvalent metal being one whose hydroxide is soluble in water at a pH between about 8 and 12, and containing a bound ionizable acid anion, the bound polyvalent metal ion replacing at least some of the free and available carboxyl groups of the collagen, the partial salt containing from about 0.15 to about 0.7 millimole of bound acid per gram of collagen based upon collagen containing about 0.78 millimole of available primary amino groups per gram of collagen, and the structure being further characterized by withstanding immersion in boiling water for at least about 6 hours.

7. A unitary three-dimensional structure as defined in claim 6 wherein the polyvalent metal ion is calcium.

8. A unitary three-dimensional structure as defined in claim 6 wherein the anion is the phosphate ion.

9. A unitary three-dimensional structure as defined in claim 6 wherein the polyvalent metal ion is calcium and the anion is the phosphate ion.

10. A unitary three-dimensional structure as defined in claim 6 which includes intermixed calcium phosphate.

* * * * *

UNITED STATES PATENT OFFICE
CERTIFICATE OF CORRECTION

Patent No. 3,767,437　　　　　　Dated October 23, 1973

Inventor(s) Mamerto M. Cruz, Jr.

It is certified that error appears in the above-identified patent and that said Letters Patent are hereby corrected as shown below:

Column 1, line 45, "magnesium fluorine," should read --magnesium, fluorine--.

Title Page 1 and Column 1, line 1 "Phosthetic" should read --Prosthetic--.

Column 11, line 54, "withe" should read --white--.

Signed and sealed this 15th day of April 1975.

(SEAL)
Attest:

RUTH C. MASON
Attesting Officer

C. MARSHALL DANN
Commissioner of Patents
and Trademarks